Feb. 24, 1942.　　　　M. E. COLLINS　　　　2,274,529
SOUND FILM RECORDING APPARATUS
Filed April 28, 1939
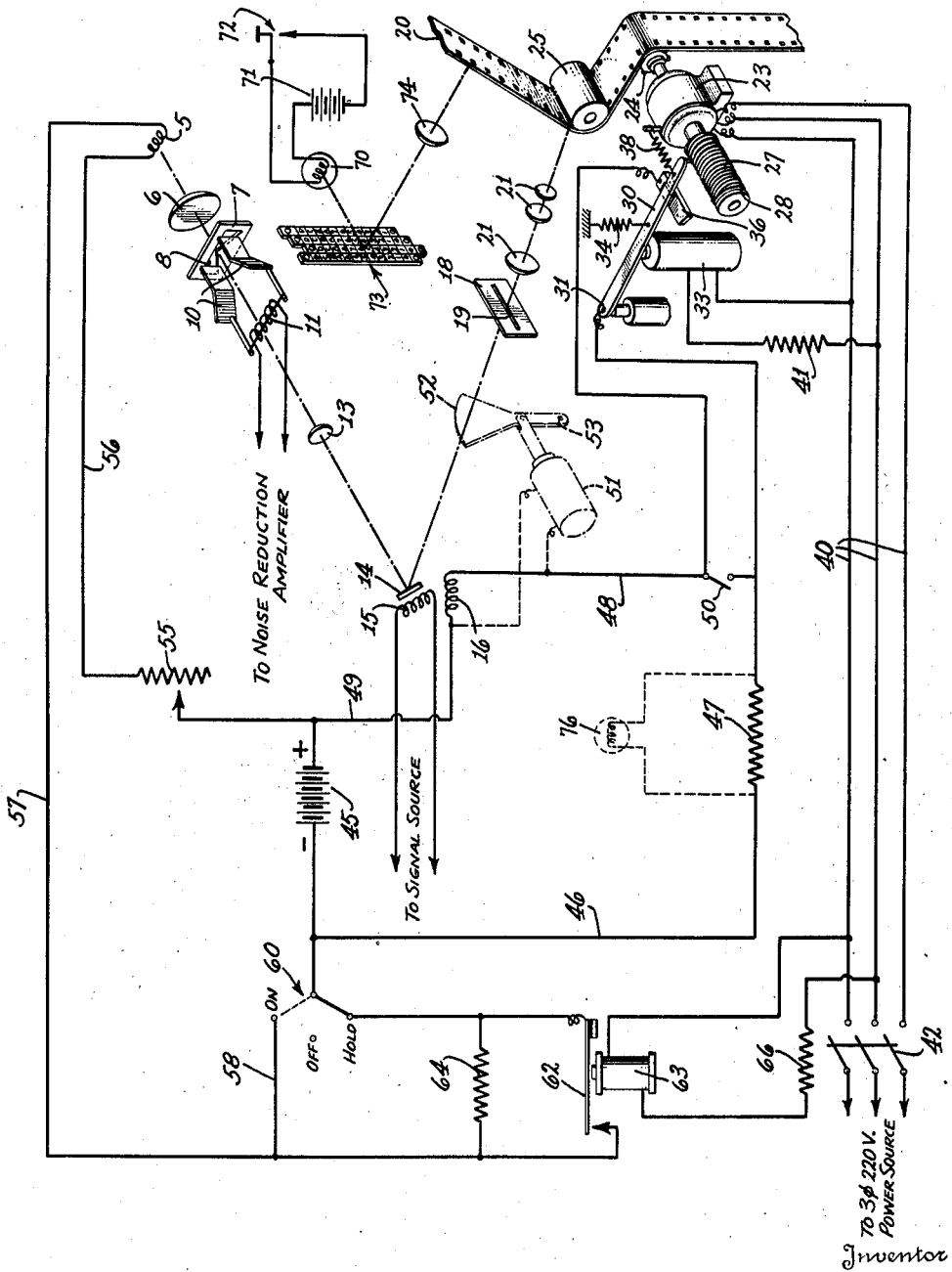
Inventor
MILFORD E. COLLINS,
By
Attorney Patented Feb. 24, 1942

2,274,529

UNITED STATES PATENT OFFICE 2,274,529

SOUND FILM RECORDING APPARATUS

Milford E. Collins, Los Angeles, Calif., assignor to Radio Corporation of America, a corporation of Delaware Application April 28, 1939, Serial No. 270,554

10 Claims. (Cl. 179—100.3)

This invention relates to sound film recording apparatus and particularly to control mechanisms and circuits for starting and operating a sound film recorder and synchronizing a sound negative film with a picture negative film.

In the recording of sound for talking motion pictures it is well known that the picture is usually recorded on one negative film, and the sound is recorded on a second negative film. For concomitant sound, the two films are advanced simultaneously and synchronously so that when the sound and picture are later combined on a single film, the proper correlation between the two will be obtained. Various methods of and means for indicating a correlated point on each negative when the films are running in synchronism are known, one feature of the present invention being directed to a marking system which will provide such synchronization marks during the running of the film in synchronism.

It is also well known in the art of sound recording that a constant high intensity light source is employed, the light beam therefrom being modulated by a galvanometer or light valve to produce the sound track on the film. The intensity of this light source must, for optimum results, remain constant during recording, since any variations in intensity would be recorded on the film and would appear as distortion on the sound track. In actual practice, recording of picture and sound occurs over short periods of time referred to as "takes" or "sequences," between which there are periods of inactivity. Because of the time required for the light source to reach a steady output state or equilibrium, the light source is generally left energized during the nonrecording periods. This materially shortens the life of the lamp. Since high intensity recording lamps are not uniform in either intensity or construction and it requires considerable time to adjust them, any decrease in the necessity for changing them is desirable.

The apparatus of the present invention solves this problem by automatically reducing the energy supplied to the lamp during the nonrecording periods to a standby value. This standby energization is such that upon actuation of the recorder the lamp filament can be immediately brought up to a stable operating incandescence. This control of the energy to the lamp of course lengthens its life with the attendant advantages mentioned above.

In sound recording systems each take is marked or slated to identify the picture and take for editing purposes. In certain sound recording systems, the films are marked while stationary, while in others the marking is accomplished while the films are running in synchronism. These slate marks may be made photographically on the stationary film between the reel of raw stock and the sound recording translation point, or between the translation point and the takeup reel, an identification slater of the former type being disclosed and claimed in my U. S. Patent 2,184,546 of Dec. 26, 1939. Regardless of the position of the slate images, it is realized that if they are also light impressed with the recording light beam, the latter will erase or blur them. To protect these identification marks, therefore, it is necessary to eliminate the light beam from the film during the passing of the latent images from the slate or from the area of the film upon which the images are to be impressed.

The principal object of this invention, therefore, is to increase the efficiency and stability of sound recording apparatus.

Another object of the invention is to facilitate the recording of sound on one film simultaneously with recording of a concomitant picture on a separate film.

A further object of the invention is to facilitate relating the beginning and identification of a sound sequence with respect to the beginning of a correlated picture sequence recorded simultaneously.

A further object of the invention is to simultaneously produce marks on a sound film and on a picture film.

Although the novel features which are believed to be characteristic of this invention are pointed out with particularity in the claims appended herewith, the manner of its organization and the mode of its operation will be better understood by referring to the following description read in conjunction with the accompanying drawing forming a part thereof, in which The single figure is a combination diagrammatic and schematic view of a sound recording system embodying the invention.

Referring now to the drawing, a light source illustrated by a filament 5 produces light which is collected by a condenser lens 6 and projected onto a mask 7 having an aperture 8 therein. The amount of light passing the ends of aperture 8 is controlled by a pair of shutters 10 actuated by a coil 11 which is connected to the output of a noise reduction amplifier. The light passing the aperture 8 and shutters 10 is projected by a lens 13 upon a mirror 14 of a galvanometer having an actuating coil 15 connected to the signal source. The galvanometer has a second coil 16, the purpose of which will be explained hereinafter. The light reflected from the mirror 14 is projected upon a mask 18 having a slit 19 therein, after which it is projected upon the sound track portion of a film 20 by lenses 21. A system of this type has been disclosed and claimed in U. S. Patents 2,102,776; 2,102,777 and 2,102,778.

To illustrate the principle of the present invention, the essential elements for advancing the film are shown diagrammatically as consisting of a motor 23 driving a sprocket 24 over which the film passes. The film is pulled by the sprocket 24 over a roller 25, the light beam contacting the film while passing over the roller 25, this contact point being known as the translation point. Also directly connected to the motor 23 is a worm 27 having at the end thereof an annular groove 28. Reduction gears may be inserted intermediate the motor and either sprocket 24 or worm 27, depending upon the motor speed and the differential speed relationship desired between the sprocket and worm.

Adapted to be inserted in the grooves of the worm 27 is a projection at the end of a lever 30 which may be pivotal and rotatable about its other end 31. The lever is pulled downwardly by a solenoid 33 so that the projection enters the threads of worm 27. Upon deenergization of the solenoid, a spring 34 pulls the projection out of the threads, and a spring 38 pulls it to the right to its inoperative or rest position. When the lever 30 is pulled downwardly, an electrical contact is made with a stationary block segment 36. Rotation of the worm 27, with the solenoid 33 energized, moves the lever 30 over segment 36 maintaining the electrical contact until the end of segment 36 is reached, when the contact is broken. The projection of lever 30 then enters the annular groove 36, and the lever remains stationary until the solenoid 33 is deenergized. It is to be understood that the film drive, lever and worm arrangement just described is only diagrammatic to illustrate that a definite relationship is obtained between length of electrical contact at 36 and length of film past the translation point. In actual practice, the lever 30 is pivoted above solenoid 33, and segment 36 is in two separated parts, contact being made therebetween by lever 30. In this manner, no current passes through the lever.

The motor 23 may be energized in any suitable manner such as from a three-phase, 220-volt source over conductors 40. This motor may be of the interlock type or of the synchronous type. Across one phase of the three-phase source is connected the solenoid 33 preferably through a series resistance 41 for obtaining the proper working voltage. A three-pole starting switch 42 is provided in the power supply conductors for the motor. Thus, when the switch 42 is closed, not only is the motor 23 energized, but also the solenoid 33, to make the predetermined electrical contact, as explained above. The definite relationship between the amount of film passing the translation point and the period of contact at segment 36 exists because both are determined by the same factor, namely, the revolutions of the motor 23. The purposes of this relationship will be explained hereinafter.

The closing of the contact at 36 energizes the coil 16 of the light modulating galvanometer from a battery source 45, over conductors 46, resistance 47, over lever 30, segment 36, conductor 48 and conductor 49. Energization of the coil 16 actuates the mirror 14 which, in turn, deflects the light beam away from the film 20. It is obvious that the light beam will remain away from film 20 while the last traced circuit is maintained, which is during the time that it takes the worm 20 to move the lever 30 to the annular groove 28. Thus, for a certain number of revolutions of the motor 23, corresponding to a definite length of the film 20 past the translation point, the light from the source 5 will remain off the film 20. Therefore, a specific relationship exists between the time the motor 23 is energized and the time the light beam strikes the film. To manually energize circuit 45 to 49 a switch 50 is provided.

As mentioned above, identification means are usually employed to identify each take, some means being only a series of separate character punches, while other means are of the photographic type. In the present system, a type of photographic means is shown diagrammatically as consisting of a light source 70, battery 71, manual key 72, a plurality of different character slides 73, and a lens 74 for focusing the slides on the film 20. This type of identification means is shown in my above-referred-to Patent No. 2,184,546. This system operates by adjusting the slides 73 to the proper characters and then momentarily closing the switch 72 to illuminate them, since the lamp 70 and the face of the characters along with lens 74 are in a light-tight compartment communicating with the film 20. The impression of the character images on the film is of course accomplished during stationary periods of the film and, although this may be done on either side of the translation point, it is preferable to do it ahead of it, as shown in the drawing.

Now, if the images of the identification marks are impressed on the film 20 above the roller 25, as shown, these images will be eliminated or at least be blurred when they pass the recording light beam. To prevent this elimination and to protect the images is a function of the circuit including winding 16 which eliminates the recording beam from the film while the latent images of the identification marks pass the translation point.

Another function of this circuit 45 to 49 is to produce a start mark on the sound negative and on the picture negative so that these two negatives may be longitudinally correlated. This is accomplished by inserting in the circuit 45 to 49, a lamp 76. This lamp 76 is located in the picture camera, and, when energized, fogs the picture film. The lamp is shown connected across the resistance 47, but it may be in series with the 45—49 circuit or be operated by a relay controlled by this circuit. Thus, the lamp 76 will be energized during the period of contact at 36 and during the time the sound recording light beam is off the sound negative. However, simultaneously with the impression of the recording beam upon the sound film by the breaking of contact at 36, the lamp 76 will be extinguished and there will then be a simultaneous marking of both picture and sound negatives. It is realized, of course, that the circuit may be such as to energize the lamp 76 momentarily at the instant the recording beam is impressed on film 20. If further marks, such as holes punched in the films while stationary, are desired for dark room purposes, these marks on the sound film will bear a direct footage relationship to the photographic mark made by the return of the recording beam to the film 20 because of the physical connection between the worm 27 and the sprocket 24, as explained above.

The elimination of the recording beam from the film 20 may also be accomplished by the apparatus shown in the dotted lines shunting the coil 16. This apparatus comprises a solenoid 51 and a shutter 52 pivoted at 53 and adapted to be inserted in the recording light beam upon energization of solenoid 51. Thus, the apparatus 51 and 52 is an alternative means for shielding the identification marks impressed by means 71—74 and for impressing a start mark when the recording beam is impressed on the film 20 by removal of the shutter 52 from the path of the beam.

Referring now to the energizing circuit for the recording lamp 5, the battery 45 also supplies the energy for this lamp over a circuit including a voltage control resistance 55, conductor 56, conductor 57, and then either over a conductor 58 and a switch 60 when the latter is in the "on" position, or through an armature 62 when its actuating solenoid 63 is energized and the switch 60 is in the "hold" position, or through a resistance 64 when the switch 60 is in the "hold" position. This latter circuit is the nonrecording or standby position of the recorder, as referred to above.

Now, when the power switch 42 is closed, the solenoid 63 is energized over one phase of the three-phase supply, preferably through a voltage control resistance 66 similarly to solenoid 33. Thus, before the recorder is started, the switch 60, which is normally in "off" position, may be thrown to the "hold" position, and a certain amount of energy is supplied to the lamp 5 to maintain it below normal brilliancy. When the starting switch 42 is closed, the motor 23, the solenoid 33 and solenoid 63 are energized. Energization of solenoid 63 shorts out the resistance 64, and the lamp 5 is immediately brought up to full recording brilliancy. As soon as the switch 42 is opened to stop the recorder, the solenoid 63 is deenergized and the lamp 5 returns to partial or standby brilliancy. Thus, it is unnecessary to maintain the lamp 5 at full brilliancy during standby periods to insure its stability and thus shorten its life. It is also to be observed that the battery 45 not only supplies the energy for the lamp 5, but also for the identification protector and the synchronization marks for the respective picture and sound negatives. The automatic lamp control may be eliminated by throwing switch 60 to its "on" position.

I claim:

1. A sound recording system comprising means for producing a light beam, means for continuously projecting said light beam on a motion picture film, a galvanometer for modulating said light beam, means for overmodulating said galvanometer to eliminate said light beam from said film, means for advancing said film, a second light source, means for periodically projecting said second light source on said film, and means for energizing said galvanometer overmodulating means for eliminating said first light beam from said film during the advancement of a predetermined length of film, said length of film having thereon images made by said second light source.

2. A sound recording system in accordance with claim 1 in which said last-mentioned means comprises an electrical contact, means driven by said film advancing means for making said contact a predetermined length of time, and an electrical circuit through said galvanometer and energized by said contact for overmodulating said galvanometer.

3. A sound recording system comprising a source of light, means for projecting light from said source on a motion picture film, means for advancing said film, means for energizing said film advancing means, means for eliminating said light from said film, means energized from said film advancing energizing means for controlling said light eliminating means, a second motion picture film, means controlled by said light eliminating means for light impressing said second film, said light eliminating means being positively interconnected with said film advancing means to simultaneously control the light impression of said films.

4. A control system for sound motion picture apparatus comprising means for advancing a motion picture film, a source of energy for said film advancing means, a light source, means for normally impressing the light from said source upon said film, means for subenergizing said light source, means for increasing the energization of said light source, means for activating said light impressing means for eliminating the light from said light source during the acceleration period of said film by said advancing means, circuit means for controlling said light elimination means, means interconnecting said film advancing means and said circuit means for definitely energizing said circuit means during a predetermined number of revolutions of said film advancing means, means actuated by said source of energy for said film advancing means for energizing said circuit means, and means for actuating said means for increasing the energization of said light source, said last-mentioned means decreasing the energization of said light source to subnormal energization when said film advancing means is deenergized.

5. Motion picture apparatus comprising means for marking a film while stationary, means for advancing said film at a uniform constant speed, means for impressing said film with modulated light while being advanced at said uniform constant speed, and means physically connected with said film advancing means and electrically connected to said means for light impressing said advancing film to actuate said light impressing means during a predetermined number of revolutions of said film advancing means.

6. Motion picture apparatus in accordance with claim 5 in which electrical means are provided for simultaneously marking a second film at the time of marking said first film.

7. Motion picture apparatus comprising means for photographically marking a film while stationary, means for advancing said film at a uniform constant speed, means for impressing said film with sound modulated light while running at said uniform constant speed, means for electrically controlling said sound modulated light impressing means, and means for correlating the period of actuation of said light impressing means with a predetermined length of said film.

8. Motion picture apparatus in accordance with claim 7 in which said last-mentioned means comprises a motor, a film drive sprocket driven by said motor, a worm gear driven by said motor, and an electrical circuit, and a solenoid-operated armature pivoted at one end, the other end thereof being adapted to contact said worm gear, said armature closing said electrical circuit for actuating said light impressing means, a predetermined number of revolutions of said worm gear being definitely related to a certain number of revolutions of said sprocket.

9. Sound film apparatus comprising a source of light, means for impressing said light on said film, means for modulating said light in accordance with sound waves, means for advancing said film, means for actuating said modulating means to eliminate the impression of said light on said film, means for varying the degree of energization of said light source, and means for simultaneously energizing said film advancing means, said light modulating means, and said light source energization varying means.

10. Sound film apparatus in accordance with claim 9 in which said means for varying the degree of energization of said light source is adapted to decrease the energization of said light source upon deenergization of said film advancing means.

MILFORD E. COLLINS.